Patented May 9, 1939

2,157,558

UNITED STATES PATENT OFFICE 2,157,558

PREPARATION OF HYPOCHLORITES

Irving E. Muskat, Akron, and George H. Cady, Wadsworth, Ohio, assignors to Pittsburgh Plate Glass Company, Allegheny County, Pa., a corporation of Pennsylvania No Drawing. Application April 14, 1937, Serial No. 136,803

8 Claims. (Cl. 23—86)

The present invention relates to a method of preparing hypochlorites; more particularly it refers to a method of making hypochlorites by the reaction of chlorine monoxide with alkaline materials.

One object of the invention is to provide a chlorine containing material in which an exceptionally high proportion of chlorine is contained in the "true" and highly reactive hypochlorite (—OCl) group.

A second object of the invention is to provide a convenient and economical method of preparing the above described product. These and other objects will be apparent from consideration of the following specification and the appended claims.

True calcium hypochlorite is distinguished from bleaching powder by the fact that bleaching powder is essentially

that is, it contains one hypochlor (—OCl) group and one chlorine atom per molecule; while "true" calcium hypochlorite is represented by the formula

that is, it contains two OCl groups per atom of calcium. Since this group constitutes the active radical of the compounds, "true" calcium hypochlorite has a much greater oxidizing value than bleaching powder. This oxidizing power is usually expressed in terms of "active chlorine" content; that is, twice the weight of the hypochlorite chlorine divided by the weight of the sample. Multiplying this figure by 100 gives the "active chlorine" percentage. "True" calcium hypochlorite has a theoretical "active chlorine" content of 99.2%, while the ordinary bleaching powder of commerce has an "active chlorine" content of approximately 35–38%. There is, therefore, a great advantage with the "true" hypochlorite with respect to its oxidizing strength, its purity, and shipping, storing and handling costs as compared with bleaching powder. In addition, "true" calcium hypochlorite is usually more stable. This advantage has spurred many efforts to prepare true calcium hypochlorite. Products containing from 65% to 72% "active chlorine" are now articles of commerce, but they obviously fall short of being pure calcium hypochlorite with its "active chlorine" of 99.2%.

In accordance with the present invention we have discovered that chlorine monoxide at a temperature above about 25° C. and in the presence of an inert liquid medium may be caused to react with calcium hydroxide to form a product containing a very high percentage of true calcium hypochlorite and, therefore, possessing a substantially higher "active chlorine content" than any product now available on the market.

The reaction proceeds, according to theory, as follows:

$$Cl_2O + Ca(OH)_2 \rightarrow Ca(OCl)_2 + H_2O$$

Chlorine monoxide may be produced in known manner by contacting chlorine gas with mercuric oxide or by reacting chlorine gas with soda ash in the presence of a small amount of water or with sodium bicarbonate. The reactions involved are represented as follows:

$$2Na_2CO_3 + Cl_2 + H_2O \rightarrow Cl_2O + 2NaHCO_3 + 2NaCl$$
$$2NaHCO_3 + 2Cl_2 \rightarrow NaCl + Cl_2O + 2CO_2 + H_2O$$

Convenient embodiments of the processes are disclosed in detail in copending applications of George H. Cady, Serial No. 190,618, filed February 15, 1938, and of Irving E. Muskat and George H. Cady, Serial Nos. 136,802 and 136,803 filed April 14, 1937.

Carbon tetrachloride acting as a reaction medium may constitute the liquid diluent. Chlorine may, also, be present in the reaction mixture. This element normally reacts with alkali or alkaline earth metal compounds such as hydrated lime to form bleaching powder, or calcium chloride in admixture with calcium hypochlorite. However, when chlorine monoxide is present, the bleaching powder or calcium chloride is converted largely into calcium hypochlorite.

Oxides of chlorine other than chlorine monoxide may be present in such small amounts as not to interfere in the reaction.

The chlorine monoxide may be bubbled through a suspension of hydrated lime in carbon tetrachloride maintained above 25° C. or hydrated lime may be agitated with a solution of chlorine monoxide in carbon tetrachloride kept above 25° C. Again, the major part of the reaction may be conducted below 25° C. and carried to completion above 25°. Reaction may be effected in a mill— e. g. a ball or rod mill in order to expose fresh surfaces of lime and thus to speed up the reaction.

If chlorine monoxide is prepared in solution, for example, by contacting chlorine gas with mercuric oxide or soda ash in such liquid medium as carbon tetrachloride, this solution may be freed of solids by settling, centrifuging, or filtering and then employed directly in the preparation of hypochlorites. The reaction medium is thus made to serve in both the preparation and the subsequent reaction of the chlorine monoxide. After freeing the carbon tetrachloride of its hypochlorite content, it may be recycled.

The lime to be used may preferably be hydrated lime, and may be prepared in known manner by slaking calcium oxide with water. The calcium oxide should preferably be active and of good purity to insure a final product with a high percentage of calcium hypochlorite. Lime of commercial quality yields a good product.

The calcium hydroxide used for this process may for satisfactory operation, either be free from calcium oxide and uncombined water or it may contain one or both of these substances. Because of its small reactivity toward chlorine monoxide, however, a large excess of calcium oxide is preferably to be avoided. On the other hand, the proportion of water may be large and the lime may be suspended in the form of a fluid slurry. When a solution or suspension of calcium hypochlorite is prepared from milk of lime, it is preferred that the amount of chlorine monoxide and chlorine should be limited to such an extent that the lime is not completely used up; otherwise, the calcium hypochlorite will decompose rapidly. If the proper precautions are taken it is possible to prepare solutions or suspensions from which solid calcium hypochlorite may be separated by filtration, evaporation, crystallization or by any suitable combination of these operations.

Calcium hydroxide may be obtained as a powder by the slaking of quicklime with water insufficient to produce a paste, or a slurry. The content of calcium oxide or of uncombined water in the powder is not large; for example, not greater than 20%. It generally is found, however, that this narrow limitation on the composition is not necessary to the success of the various processes, and the claims are not limited to any range of composition.

The chlorine monoxide is dissolved in the liquid carbon tetrachloride, and a substantially equivalent amount of hydrated lime in powdered form is added and the mixture is agitated. It has been found that too great a concentration of chlorine monoxide results in the formation of some calcium chlorate, and for this reason substantially equivalent amounts of reactants are preferred. An excess of chlorine monoxide may be employed if a relatively large amount of solvent is used, thus insuring a low concentration of chlorine monoxide. Concentrations as low as one gram per liter or less may be used, but since such low concentrations require the use of uneconomically large quantities of solvent, concentrations of at least 20 gms. per liter are preferable and saturated solutions may be used.

Because of the formation of chlorate in the presence of excess chlorine monoxide, it is preferred to contact the lime and chlorine monoxide solution in either a batch method or in parallel flow, since counter-current flow would bring fresh chlorine monoxide solution into contact with finished hypochlorite. However, if very dilute chlorine monoxide solutions are used, counter-current flow is admissible.

It is preferred to carry out this reaction between 25 and 40 or 50° C. At lower temperatures the final product may not contain as high a percentage of "active chlorine," as may be desirable while at higher temperatures too great a quantity of the solvent is vaporized. However, it is quite satisfactory to carry the reaction at temperatures below 25° until the highest possible "active chlorine" content for that temperature has been formed, and then raising the temperature above 25° and completing the reaction to give the high "active chlorine" content typical of this process. Temperatures higher than 40° or 50° C. may be used if suitable provision is made for refluxing the vapor or adsorbing it with an agent such as carbon black or silica gel for recovery in known manner.

To obtain a product with an even higher "active chlorine" content and to speed up reaction, the product at any intermediate stage may be reduced to a smaller particle size to expose fresh surfaces to the chlorine monoxide. This may be accomplished by grinding in a ball mill, dispersion in a colloid mill or by any similar treatment. This may be effected by withdrawing the lime for grinding and then returning it to the reaction zone. Alternatively the grinding may be carried on simultaneously with the reaction, as by conducting the reaction in a rotating ball or tube mill.

The products manufactured by the above processes usually contain water, which is preferably removed in order that the stability of the calcium hypochlorite may be increased. The bulk of the solvent may be removed by distillation from the solid product, the solvent being recovered by condensation and/or adsorption of the vapor by carbon black, silica gel or other similar adsorbent or mixture of adsorbing agents, recovery of the adsorbed material being effected in a known manner. Distillation of the solvent serves to remove a large part of the water from the hypochlorite product. Alternatively, the bulk of the solvent may be removed by centrifuging or filtering out the solid. To complete the drying operation, the product may be subjected to vacuum at moderate temperatures or flash dried by dropping it into a rapidly-moving stream of hot air or other inert gas. Prolonged heating of the product should be avoided since the stability is adversely affected by high temperatures.

For example, when carbon tetrachloride is used as the inert medium a solution is left at the end of the reaction, which usually contains a moderate amount of chlorine and a small, but nevertheless valuable, quantity of chlorine monoxide. The loss of these substances may be largely avoided by allowing the calcium hypochlorite to settle, then removing the clear supernatant solution and finally recirculating the solution through the system, first sending the liquid through the reaction vessel used for the preparation of chlorine monoxide.

The following examples will serve to show the operation of our process:

1. About 5 parts by weight of substantially pure active hydrated powdered lime were agitated for ninety minutes with 19.2 parts of carbon tetrachloride solution containing an amount of chlorine monoxide equivalent to the lime. The temperature was maintained at 40° C. The product, dried, contained 85.7% "available chlorine" and 5.7% calcium hydroxide.

2. A run was made as in Example 1 with the temperature maintained at 10° C. instead of 40° C. The product, dried, ran 74.0% "available chlorine" and 18.9% calcium hydroxide. This again illustrates the effect of the temperature.

The reaction has been described with particularity in connection with the preparation of calcium hypochlorite. However the process may also be employed in the preparation of hypochlorites of sodium, potassium, barium, strontium, etc. In such case the hydroxide of the desired metal is substituted for calcium hydroxide. Similarly, the process is not limited to the treatment of hydroxides of these metals but may be applied to the treatment of other reactive alkali and alkaline earth metal compounds to produce the corresponding hypochlorites. For example, the chlorides of these metals such as calcium chloride or bleaching powder may be treated with chlorine monoxide in accordance with our invention to produce stable compounds of high active chlorine content.

What we claim is:

1. A process of preparing hypochlorite of calcium which comprises contacting a solution of chlorine monoxide in the presence of carbon tetrachloride with solid calcium hydroxide and maintaining the temperature above about 25° C. during at least a portion of the contact treatment.

2. A process of preparing hypochlorites of metals selected from a group consisting of alkali metals and alkaline earth metals comprising contacting a solid hydroxide of the desired metal with a solution of chlorine monoxide in carbon tetrachloride at a temperature above about 25° C.

3. A process of preparing calcium hypochlorite which comprises treating solid hydrated lime admixed with carbon tetrachloride with chlorine monoxide under a reflux condenser at a temperature above about 50° C.

4. A process of preparing calcium hypochlorite which comprises contacting solid hydrated lime with chlorine monoxide in carbon tetrachloride, at a temperature below 25° C. for a substantial period of time and then heating the mixture to a temperature of above about 25° C. and continuing the reaction.

5. A process of preparing calcium hypochlorite which comprises contacting hydrated lime in suspension in carbon tetrachloride with a mixture of chlorine monoxide and chlorine gas and maintaining the temperature above about 25° C. during at least a portion of the contact treatment.

6. A process of preparing calcium hypochlorite which comprises contacting chlorine monoxide with hydrated lime containing small amounts of water in suspension in carbon tetrachloride.

7. The process of preparing hypochlorites of the metals of the group consisting of alkali and alkaline earth metals which comprises contacting a mixture of chlorine and chlorine monoxide with a solid hydroxide of said metals capable of reacting therewith in the presence of carbon tetrachloride.

8. The process of preparing calcium hypochlorite which comprises contacting solid calcium hydroxide with a mixture of chlorine and chlorine monoxide in carbon tetrachloride.

IRVING E. MUSKAT.
GEORGE H. CADY.